(12) United States Patent
Postelnicu et al.

(10) Patent No.: US 9,055,376 B1
(45) Date of Patent: Jun. 9, 2015

(54) CLASSIFYING MUSIC BY GENRE USING DISCRETE COSINE TRANSFORMS

(71) Applicant: Google Inc., Mountain View, CA (US)

(72) Inventors: Gheorghe Postelnicu, Zurich (CH); Aviv Reznik, Rüschlikon (CH); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 13/791,131

(22) Filed: Mar. 8, 2013

(51) Int. Cl.
 *H04R 29/00* (2006.01)
(52) U.S. Cl.
 CPC .................................... *H04R 29/008* (2013.01)
(58) Field of Classification Search
 None
 See application file for complete search history.

(56) References Cited

U.S. PATENT DOCUMENTS

| | | | |
|---|---|---|---|
| 2006/0196337 A1* | 9/2006 | Breebart et al. | 84/1 |
| 2007/0112565 A1* | 5/2007 | Kim et al. | 704/229 |
| 2009/0326934 A1* | 12/2009 | Ono et al. | 704/226 |
| 2012/0209612 A1* | 8/2012 | Bilobrov | 704/270 |

\* cited by examiner

*Primary Examiner* — Paul Huber
(74) *Attorney, Agent, or Firm* — Amin, Turocy & Watson, LLP

(57) ABSTRACT

Systems and methods are provided herein relating to audio classification. Genres of music can be identified by detecting unique spectral features inherent to those genres. One example genre detected is techno music. Two dimensional discrete cosine transforms can be generated for consecutive windows of the spectrogram or chromagram. A max value of the energy of portions of the two dimensional discrete cosine transforms can be determined. The max value can be normalized and aggregated with max values related to neighboring windows. If the aggregate scores meet a genre threshold, the audio sample, or portions thereof, can be associated with a genre of music.

20 Claims, 9 Drawing Sheets

CLASSIFYING MUSIC BY GENRE USING DISCRETE COSINE TRANSFORMS

TECHNICAL FIELD

This application relates to classification of audio, and more particularly to detecting musical genres using a discrete cosine transform.

BACKGROUND

In most audio classification schemes, classification of music genres is performed in two steps. First, features are extracted from an audio signal and then a generic classification method is formed based on the extracted features of several different sets of audio clips associated with respective genres. The classification method then learns feature combinations that correspond to a respective genre. Diverse methods can use differing selections of feature sets with varying results.

Using a general classification method can have disadvantages. It can be hard to understand from the classification of various features which individual feature or set of features of audio signals actually correspond to a genre. In addition, general classification methods can be dependent on training data and it can be difficult to predict how the classifier will perform using new training data. Another potential disadvantage is that a general classification method can sometimes fail to use certain features that would prove to be more successful if a more specialized solution related to a singular genre were used.

One area where audio classification can be applied is within an audio matching system. Audio matching provides for identification of a recorded audio sample by comparing an audio sample to a set of reference samples. To make the comparison, an audio sample can be transformed to a time-frequency representation of the sample (e.g., by using a short time Fourier transform (STFT)). Using a time-frequency representation, interest points that characterize time and frequency locations of peaks or other distinct patterns of a spectrogram can be extracted from an audio sample. Descriptors can be computed as functions of sets of interest points. Descriptors of the audio sample can be compared to descriptors of reference samples to determine identity of the audio sample.

Certain genres of music can create distinct problems within an audio matching environment. Techno music, or music generated electronically that contains mostly beat can sometimes make audio matching difficult. Techno songs are not really melodic and may match other non-melodic audio signals if both the techno song and the reference sample happen to match with the features used for melody detection.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an input component receives an audio sample. A spectrogram component generates a spectrogram of the audio sample. A discrete cosine transform component generates a set of two dimensional discrete cosine transforms (DCTs) based on a window and the spectrogram. An energy component determines a max value for DCTs in the set of the DCTs where the max value is not from a first column of the DCTs. A normalization component normalizes the max value for DCTs in the set of DCTs based on a total sum of frequencies wherein the normalized max value is a score. A stability component aggregates scores for DCTs of consecutive windows based on an aggregation window threshold, wherein if the aggregate scores meet a genre threshold, the audio sample is associated with a genre of music.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
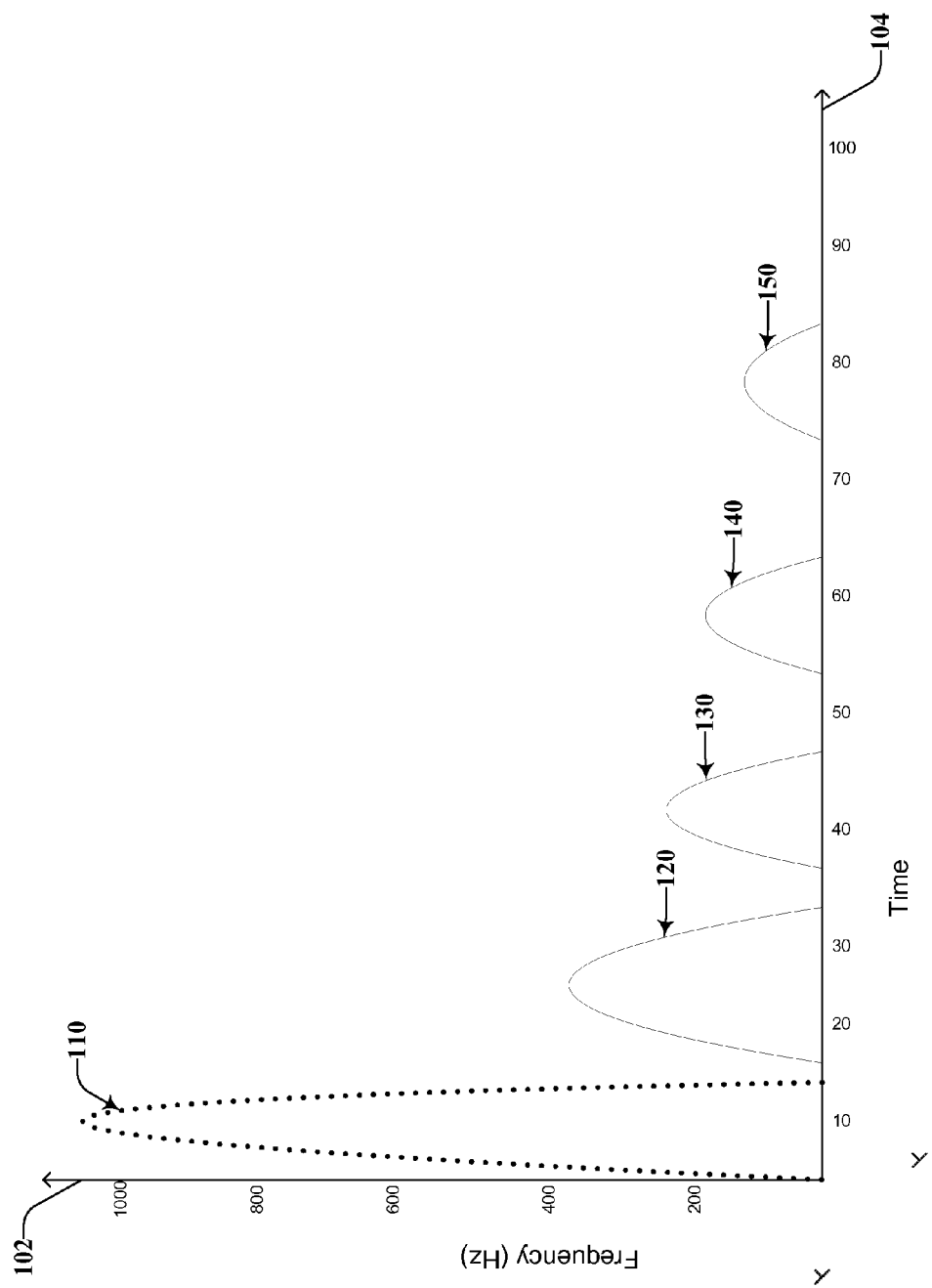
FIG. 1 illustrates an example time frequency plot of a two dimensional discrete cosine transform associated with a techno song in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio classification in general involves analyzing an audio sample for unique characteristics that can be used in comparison to unique characteristics of reference samples to classify the audio sample. As a starting point for this analysis, a spectrogram of the audio signal is constructed; the spectrogram represents an audio sample by plotting time on one axis and frequency on another axis. Amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at a specific frequency over time. The audio sample can be run through additional filters to individually isolate a set of frequencies to measure amplitude of the set over time. A spectrogram can be created by combining respective measurements over time on a frequency axis to generate a spectrogram image of frequency amplitudes over time.

A second technique involves using a short-time Fourier transform ("STFT") to break down an audio sample into time windows, where respective windows are Fourier transformed to calculate magnitude of a frequency spectrum for the duration of each window. Combining a plurality of windows side by side on a time axis of the spectrogram creates an image of frequency amplitudes over time. Other techniques, such as wavelet transforms, can also be employed to construct a spectrogram.

A chromagram can be generated from a spectrogram by using, for example, overlapping fast Fourier transforms, and then appropriately binning each output slice and condensing the output slice into a single octave. For example, a chromagram can be generated using 24 bins which would correspond to two bins per semitone. In contrast to other audio signals, the chromagram representation of a techno song, which generally has no real notes or very little melodic structure, is often seen as a collection of straight vertical lines. Acknowledging this unique chromagram structure for techno music, in several implementations, systems and methods herein provide for detecting this unique structure as a part of identifying audio samples as techno music.

Referring now to FIG. 1, there is illustrated an example time frequency plot of a two dimensional discrete cosine transform associated with a techno song in accordance with implementations of this disclosure. The depicted two dimensional discrete cosine transform is for a single window of the chromagram. It can be appreciated that the two dimensional discrete cosine transform can be calculated for windows of the spectrogram, or in some implementations, the chromagram. In non-techno musical genres, most of the energy related to the audio sample falls within the first column of energy, depicted as column 110 in FIG. 1. In normal songs, almost all the energy is concentrated on the first column, and in particular in the first row of coordinate of the first column. In techno, however, a substantial part of the energy is found on the next columns, and in particular, in the first row coordinate of those columns. Thus peaks related to columns 120, 130, 140 and 150 that are illustrated in the FIG. 1 representation of a two dimensional discrete cosine transform related to a techno song generally are not apparent or exist at much smaller levels of energy in a non-techno song. This property can be detected by ignoring the first column 110 energy, where a substantial amount of energy of normal songs is concentrated, and searching for a maximal value in the rest of the columns (e.g., 120-150). In one implementation, the maximal value can be normalized based on total sum of frequencies, including the first column, generating a score. It can be appreciated that in other implementations the normalization process can occur differently with similar results.

One technique to improve accuracy after generating normalized scores is to calculate a score for consecutive windows of the spectrogram or chromagram. For example, the window can be shifted by 1 column in time and then a set of shifted scores can be aggregated. In one example, twenty consecutive windows can be used. In an implementation, a genre threshold can be established whereby if a score of more than 75% of windows is above the genre threshold, the time of the audio sample related to the windows can be identified as associated with a genre of music, for example, techno music. It can appreciated that other aggregation techniques such as a simple average, mean data, or standard deviation information can be employed, with similar results, to improve accuracy of raw scoring data. It can be further appreciated that genre thresholds can be established for varying types of genres of music.

In an implementation, where a sequence of consecutive windowed two dimensional discrete cosine transforms are calculated, previously calculated two dimensional discrete cosine transform for a previous window can be stored and used to calculate following two dimensional discrete cosine transforms as the difference between two consecutive windows are only two columns (e.g., the column that is lost due to the shift and the column that is gained due to the shift). In one implementation, the detector can be ignorant of a size of a window providing for very large windows to be used without correlating loss in efficiency.

In one implementation, an audio matching system that is attempting to match an audio sample to a set of reference samples can invalidate regions of an audio sample that contains certain genres of music. In one implementation, regions of an audio sample containing techno music can be invalidated. It can be appreciated that in one implementation, by detecting techno songs and filtering them from an audio matching system, the precision of an audio matching system can be increased.

Figure 2:
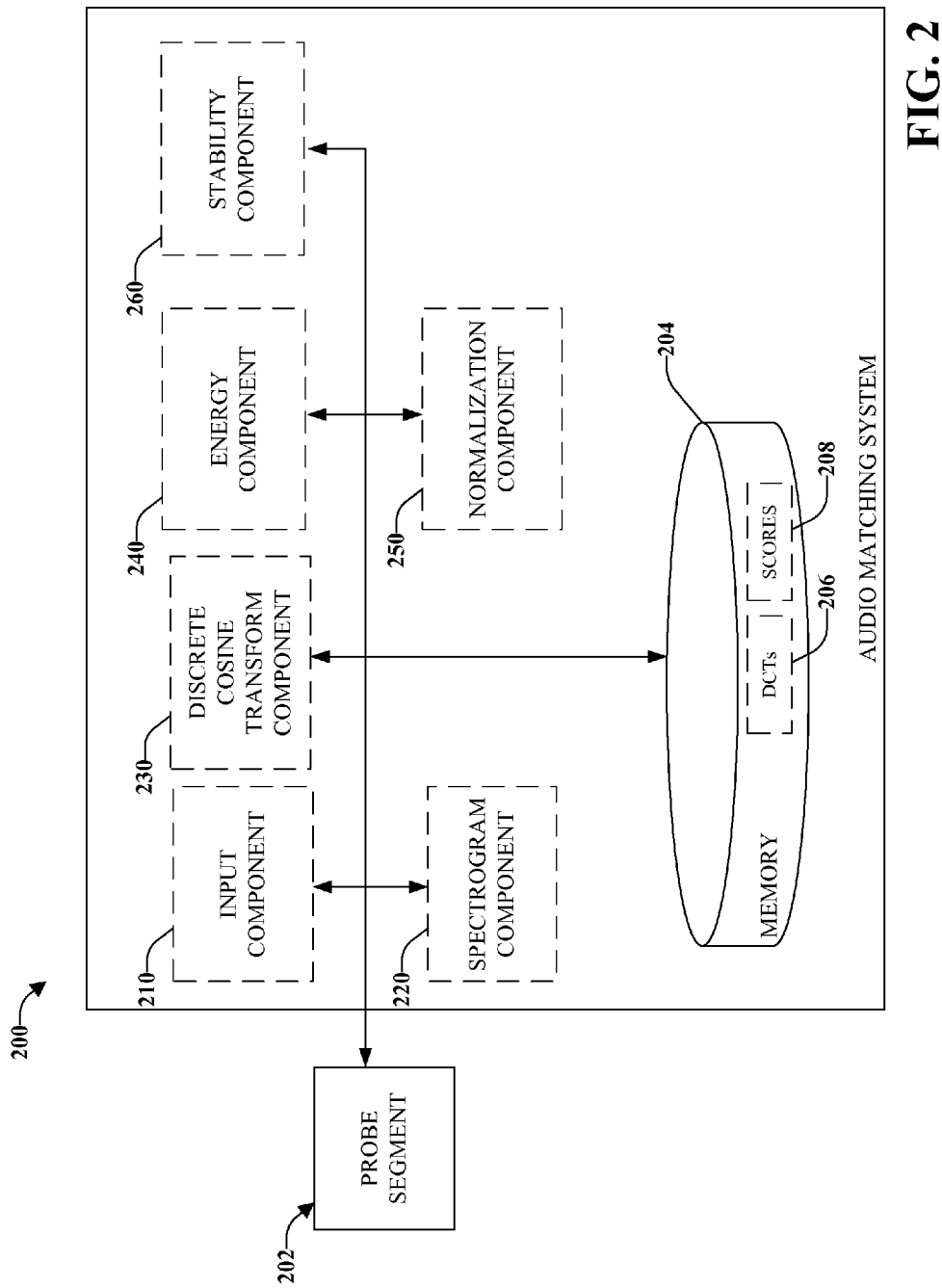
FIG. 2 illustrates a high-level functional block diagram of an example audio matching system in accordance with implementations of this disclosure.

Referring now to FIG. 2, there is illustrated a high-level functional block diagram of an example audio matching system in accordance with implementations of this disclosure. In FIG. 2, an audio matching system 200 includes an input component 210, a spectrogram component 220, a discrete cosine transform component 230, an energy component 240, a normalization component 250, a stability component 260, and a memory 204, each of which may be coupled as illustrated. Input component 210 can receive an audio sample 202. A spectrogram component 220 can generate a spectrogram of the audio sample. In one implementation, spectrogram component 220 can generate the spectrogram by taking fast Fourier transforms ("FFTs") of half-overlapping windows of the audio signal.

Discrete cosine transform component 230 can generate a set of two dimensional discrete cosine transforms (DCTs) based on a window and the spectrogram. In one implementation, the window size is 5 seconds. Energy component 240 can determine a max value for DCTs in the set of the DCTs where the max value is not from the first column of the DCTs. Normalization component 250 can normalize the max value for DCTs in the set of DCTs based on a total sum of frequencies wherein the normalized max value is a score. In one implementation, normalization component 250 normalizes the max value using at least one of an L1 norm or a L2 norm.

Stability component 260 can aggregate scores for DCTs of consecutive windows based on an aggregation window threshold, wherein if the aggregate scores meet a genre threshold, the audio sample is associated with a genre of music. For example, in one implementation, the aggregation window threshold can be twenty consecutive windows. In one implementation, stability component 260 can identify the audio sample as associated with a genre of music further based on at least seventy five percent of the aggregated scores meeting the genre threshold. In one implementation, stability component 260 can aggregate scores based on at least one of simple average, mean, or standard deviations.

Figure 3:
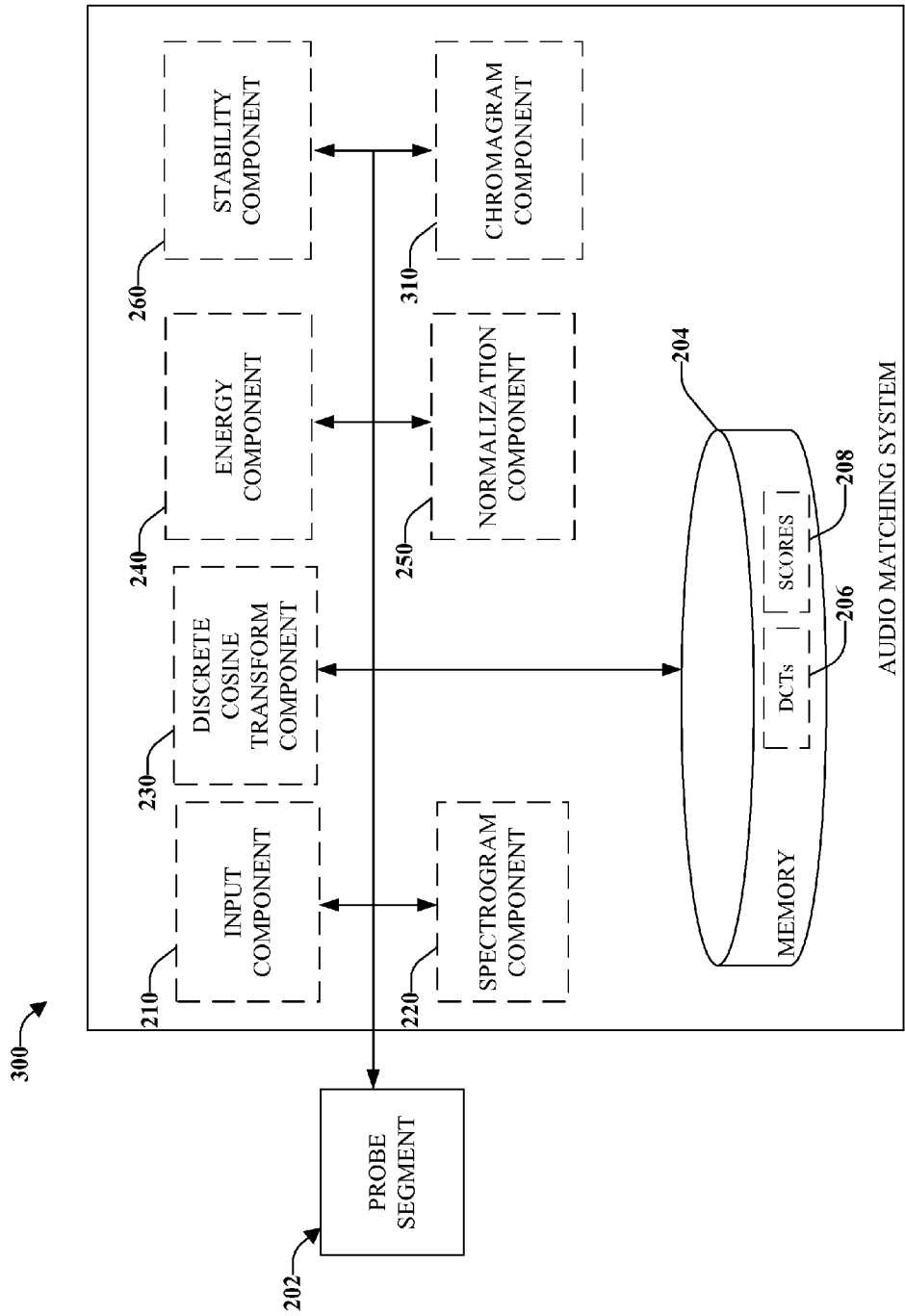
FIG. 3 illustrates a high-level functional block diagram of an example audio matching system including a chromagram component in accordance with implementations of this disclosure.

Referring now to FIG. 3, there is illustrated a high-level functional block diagram of an example audio matching system including a chromagram component 310 in accordance with implementations of this disclosure. Chromagram component 310 can generate a chromagram of the audio sample based on the spectrogram, wherein the discrete cosine transform component generates the set of two dimensional DCTs further based on the chromagram. In one implementation, chromagram component 310 generates the chromagram based on a number of bins and a single octave.

Figure 4:
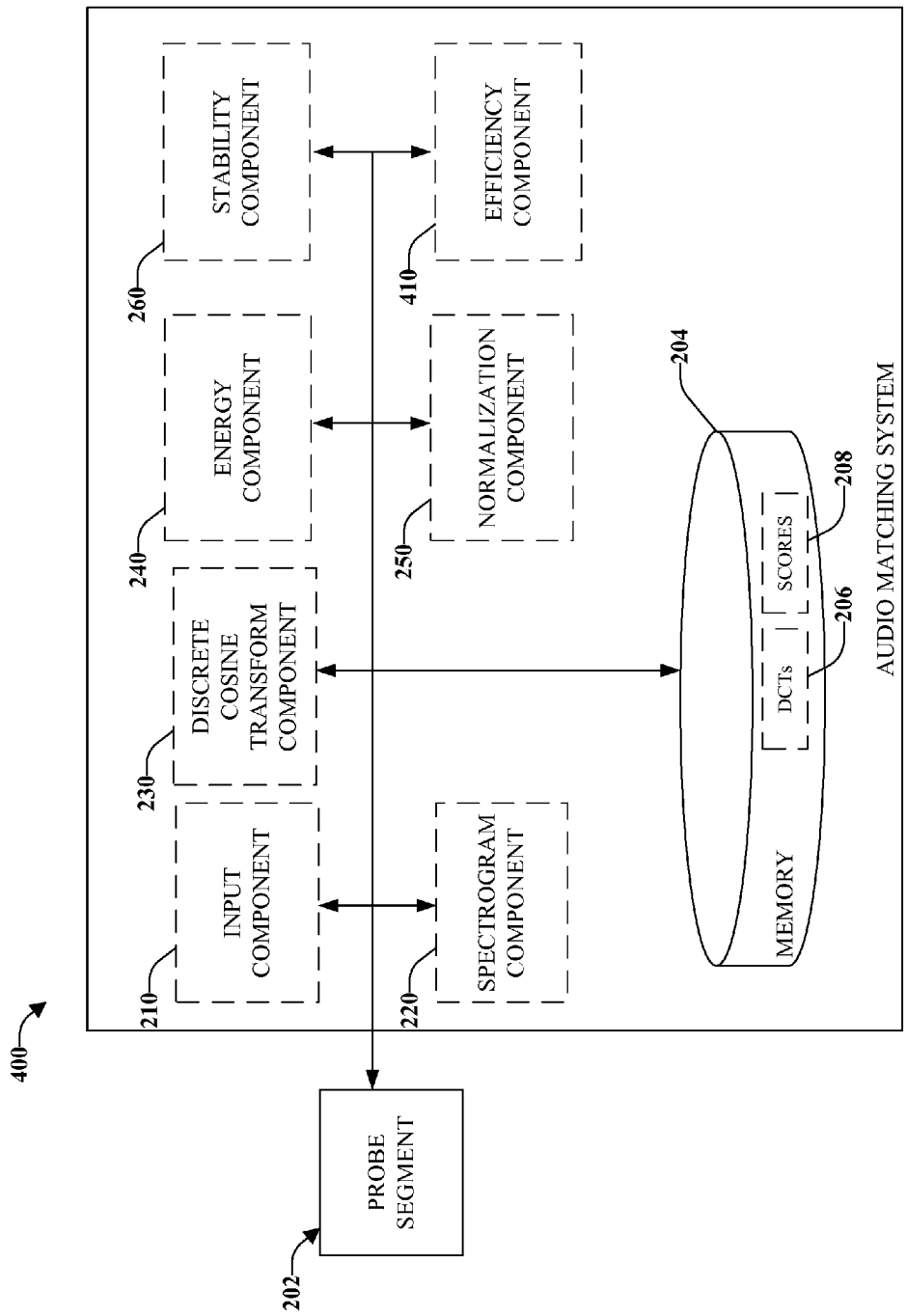
FIG. 4 illustrates a high-level functional block diagram of an example audio matching system including an efficiency component in accordance with implementations of this disclosure.
Figure 5:
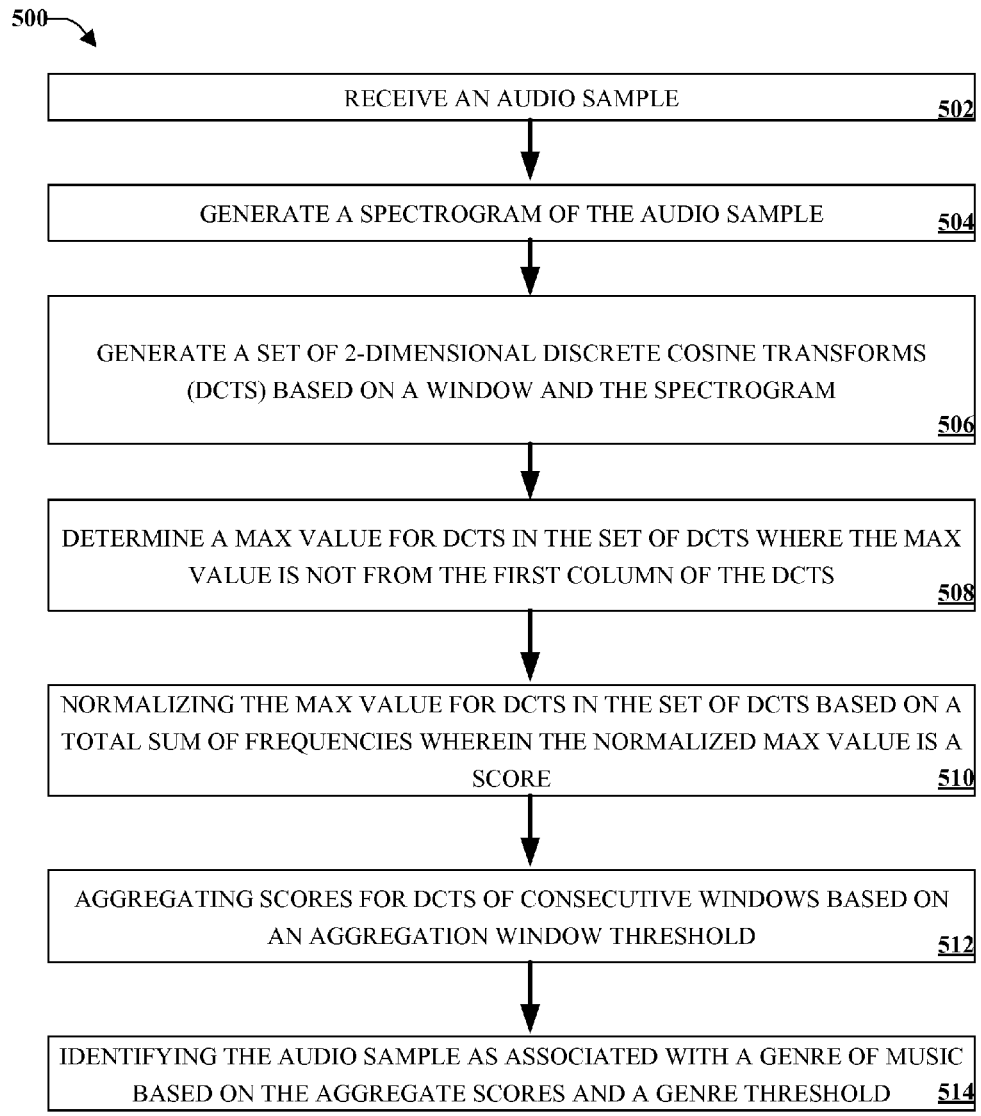
FIG. 5 illustrates an example method for identifying techno music in accordance with implementations of this disclosure.
Figure 6:
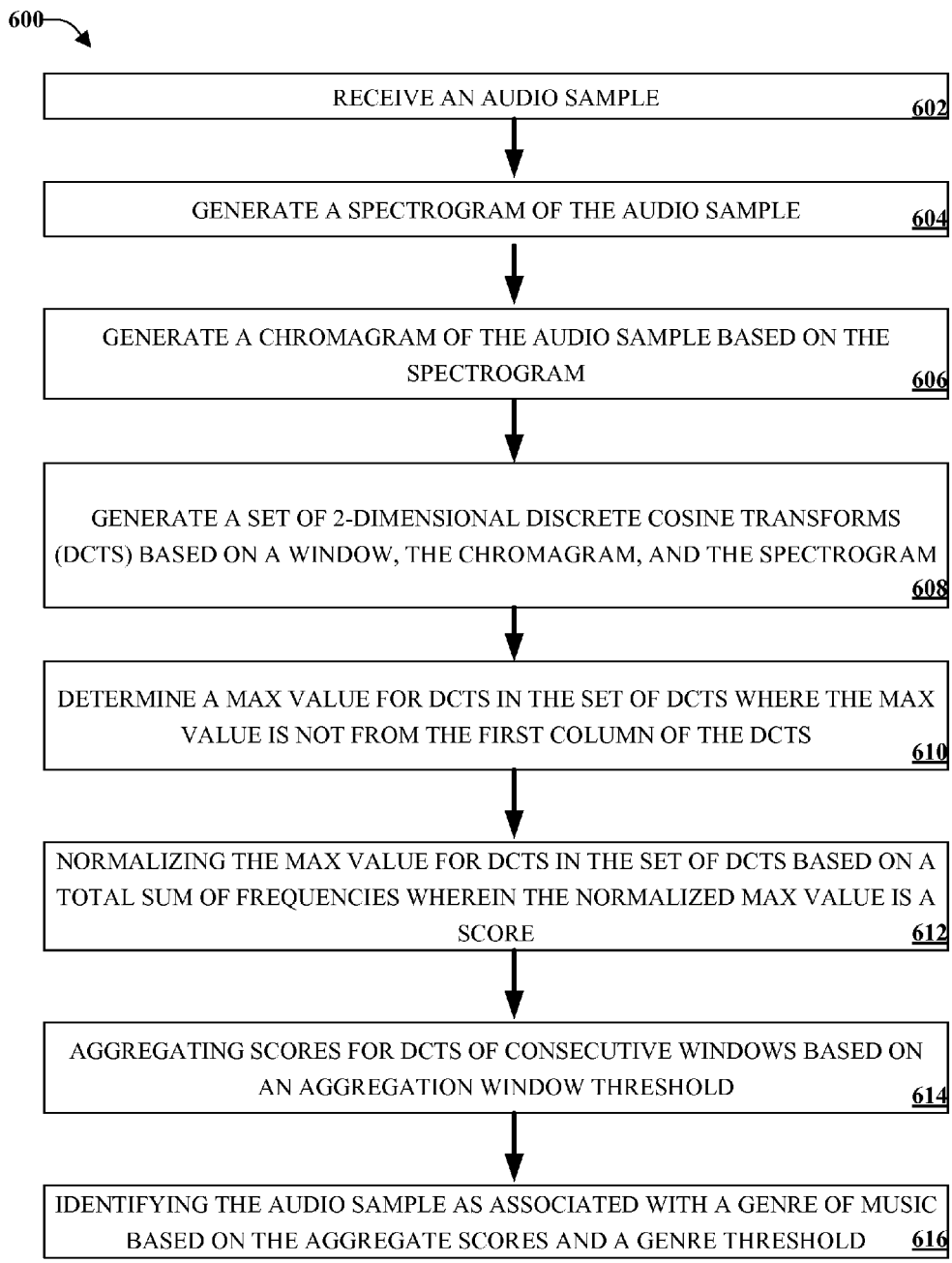
FIG. 6 illustrates an example method for identifying techno music including using a chromagram in accordance with implementations of this disclosure.
Figure 7:
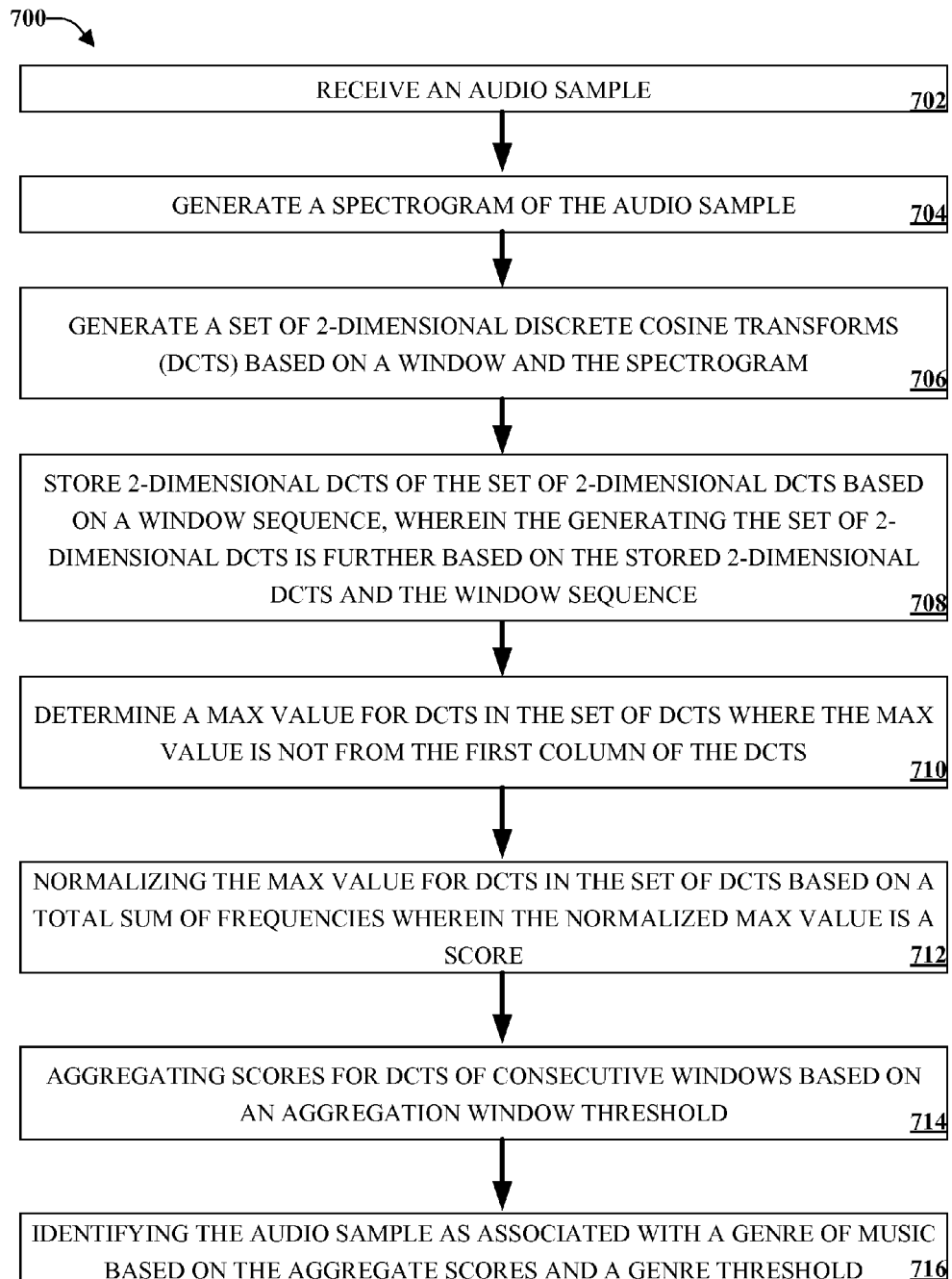
FIG. 7 illustrates an example method for identifying techno music including efficient storage of DCTs in accordance with implementations of this disclosure.

Referring now to FIG. 4, there is illustrated a high-level functional block diagram of an example audio matching system including an efficiency component 410 in accordance with implementations of this disclosure. Efficiency component 410 can store two dimensional DCTs of the set of two dimensional DCTs based on a window sequence, wherein the discrete cosine transform component 230 generates the set of two dimensional DCTs further based on the stored 2-dimensional DCTs and the window sequence FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 5 illustrates an example method for identifying techno music in accordance with implementations of this disclosure. At 502, an audio sample can be received (e.g., by an input component 210). At 504, a spectrogram of the audio sample can be generated (e.g., by a spectrogram component 220). At 506, a set of two dimensional discrete cosine transforms (DCTs) can be generated (e.g., by a discrete cosine transform component 230) based on a window and the spectrogram. At 508, A max value for DCTs in the set DCTs can be determined (e.g., by an energy component 240) where the max value is not from the first column of the DCTs. At 510, the max value for DCTs in the set of DCTs can be normalized (e.g., by a normalization component 250) based on a total sum of frequencies wherein the normalized max value is a score. At 512, scores for DCTs of consecutive windows can be aggregated (e.g., by a stability component 260) based on an aggregation window threshold. At 514, the audio sample can be identified (e.g., by a stability component 260) based on the aggregate scores and a genre threshold.

FIG. 6 illustrates an example method for identifying techno music including using a chromagram in accordance with implementations of this disclosure. At 602, an audio sample can be received (e.g., by an input component 210). At 604, a spectrogram of the audio sample can be generated (e.g., by a spectrogram component 220). At 606, A chromagram of the audio sample can be generated (e.g., by a chromagram component 310) based on the spectrogram. At 608, a set of two dimensional discrete cosine transforms (DCTs) can be generated (e.g., by a discrete cosine transform component 230) based on a window, the chromagram and the spectrogram. At 610, A max value for DCTs in the set DCTs can be determined (e.g., by an energy component 240) where the max value is not from the first column of the DCTs. At 612, the max value for DCTs in the set of DCTs can be normalized (e.g., by a normalization component 250) based on a total sum of frequencies wherein the normalized max value is a score. At 614, scores for DCTs of consecutive windows can be aggregated (e.g., by a stability component 260) based on an aggregation window threshold. At 616, the audio sample can b identified (e.g., by a stability component 260) based on the aggregate scores and a genre threshold.

FIG. 7 illustrates an example method for identifying techno music including efficient storage of DCTs in accordance with implementations of this disclosure. At 702, an audio sample can be received (e.g., by an input component 210). At 704, a spectrogram of the audio sample can be generated (e.g., by a spectrogram component 220). At 706, a set of two dimensional discrete cosine transforms (DCTs) can be generated (e.g., by a discrete cosine transform component 230) based on a window and the spectrogram. At 708, two dimensional DCTs of the set of two dimensional DCTs can be stored (e.g., by an efficiency component 410) based on a window sequence, wherein the generating the set of two dimensional DCTs is further based on the stored two dimensional DCTs and the window sequence. At 710, A max value for DCTs in the set DCTs can be determined (e.g., by an energy component 240) where the max value is not from the first column of the DCTs. At 712, the max value for DCTs in the set of DCTs can be normalized (e.g., by a normalization component 250) based on a total sum of frequencies wherein the normalized max value is a score. At 714, scores for DCTs of consecutive windows can be aggregated (e.g., by a stability component 260) based on an aggregation window threshold. At 716, the audio sample can be identified (e.g., by a stability component 260) based on the aggregate scores and a genre threshold.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 8:
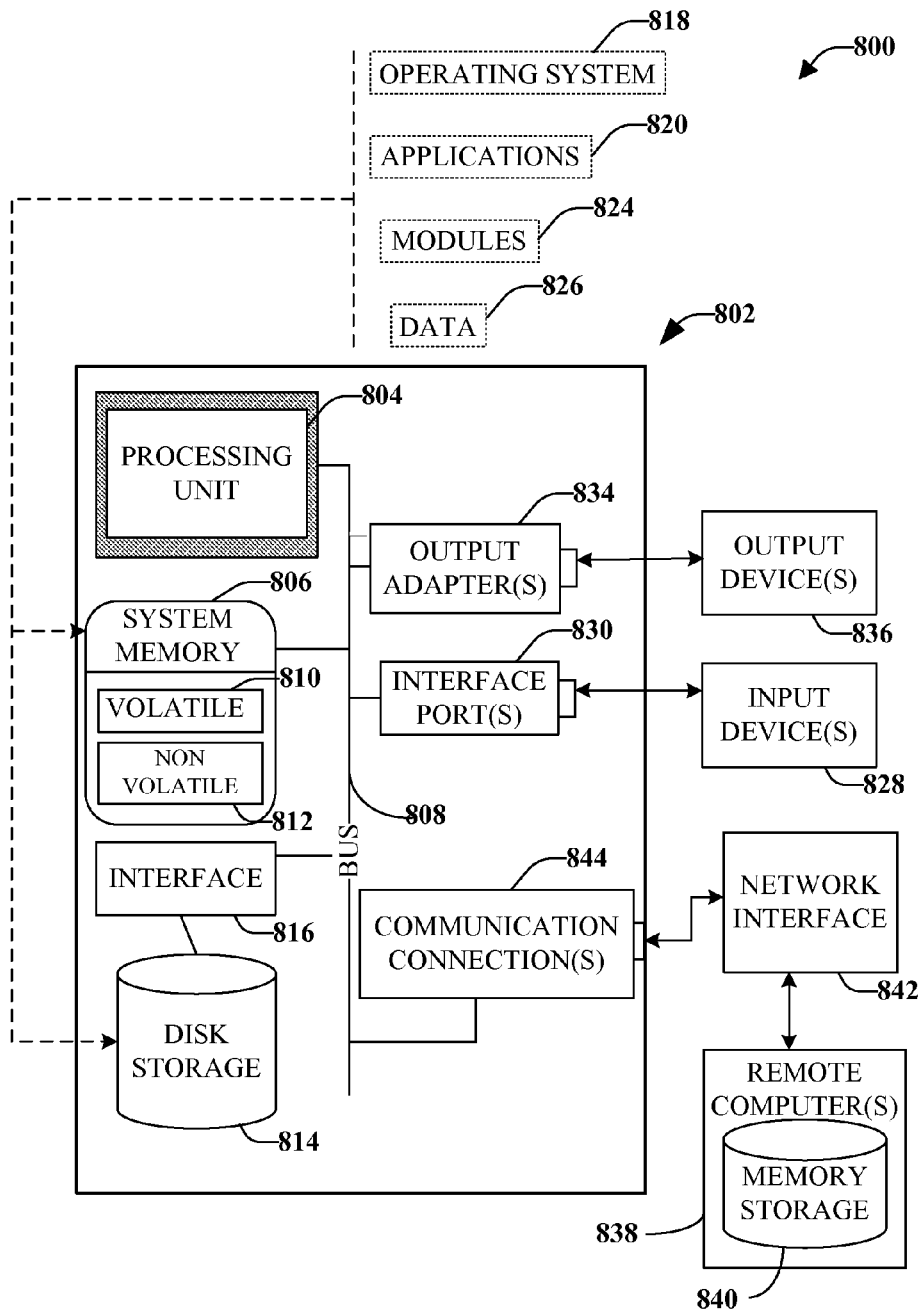
FIG. 8 illustrates an example block diagram of a computer operable to execute the disclosed architecture in accordance with implementations of this disclosure.

With reference to FIG. 8, a suitable environment 800 for implementing various aspects of the claimed subject matter includes a computer 802. It is to be appreciated that the computer, 802 can be used in connection with implementing one or more of the systems or components shown and described in connection with FIGS. 1-4. The computer 802 includes a processing unit 804, a system memory 806, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 802 may also include removable/non-removable, volatile/non-volatile computer storage media. FIG. 8 illustrates, for example, a disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828.

Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
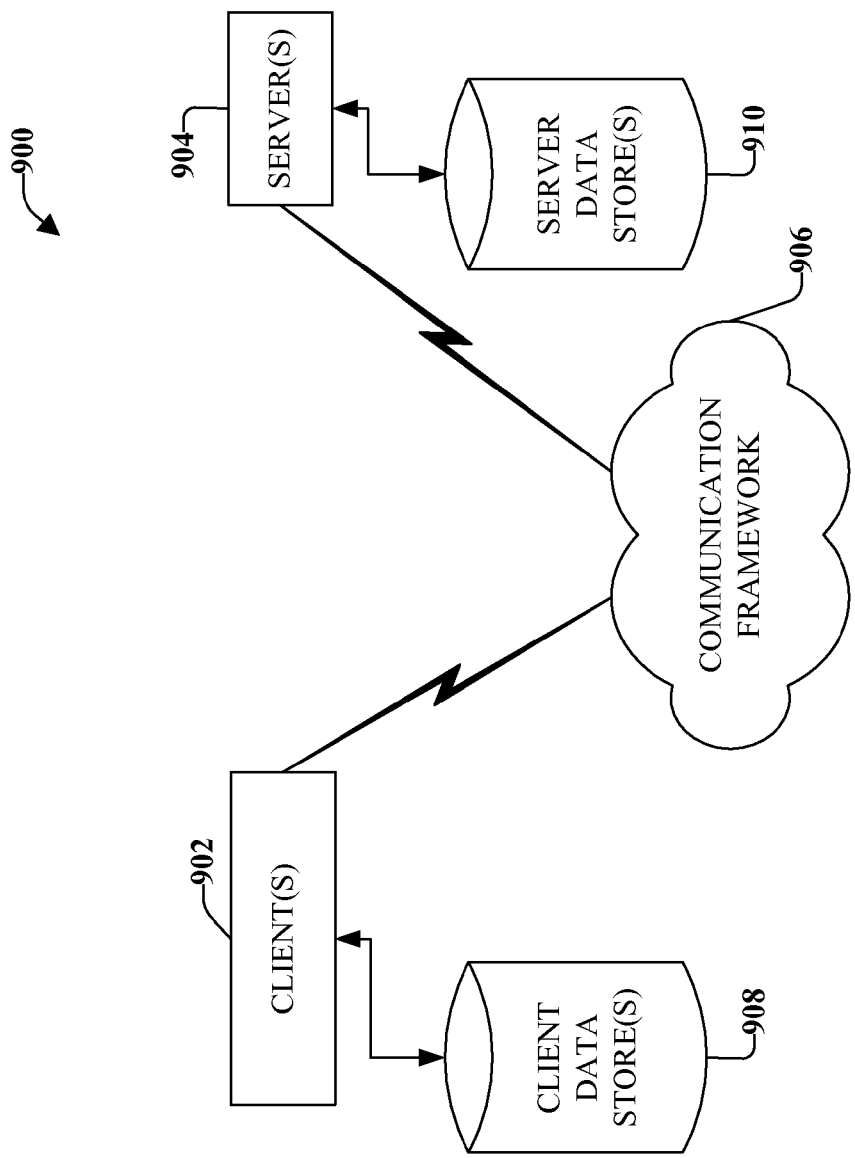
FIG. 9 illustrates an example schematic block diagram for a computing environment in accordance with implementations of this disclosure.

Referring now to FIG. 9, there is illustrated a schematic block diagram of a computing environment 900 in accordance with the subject specification. The system 900 includes one or more client(s) 902, which can include an application or a system that accesses a service on the server 904. The client(s) 902 can be hardware and/or software (e.g., threads, processes, computing devices). The client(s) 902 can house cookie(s), metadata, and/or associated contextual information and can also house threads to perform, for example, receiving an audio sample, generating a spectrogram, generating a chromagram, generating discrete cosine transforms, storing discrete cosine transforms, determining max values, normalizing data, aggregating data, identifying techno music, etc. in accordance with the subject disclosure.

The system 900 also includes one or more server(s) 904. The server(s) 904 can also be hardware or hardware in combination with software (e.g., threads, processes, computing devices). The servers 904 can house threads to perform, for example, receiving an audio sample, generating a spectrogram, generating a chromagram, generating discrete cosine transforms, storing discrete cosine transforms, determining max values, normalizing data, aggregating data, identifying techno music, etc. in accordance with the subject disclosure. One possible communication between a client 902 and a server 904 can be in the form of a data packet adapted to be transmitted between two or more computer processes where the data packet contains, for example, an audio sample or descriptors associated with an audio sample. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
   an input component that receives an audio sample;

a spectrogram component that generates a spectrogram of the audio sample;

a discrete cosine transform component that generates a set of two dimensional discrete cosine transforms (DCTs) based on a window and the spectrogram;

an energy component that determines a max value for two dimensional DCTs in the set of two dimensional DCTs where the max value is not from the first column of respective two dimensional DCTs;

a normalization component that normalizes the max value for two dimensional DCTs in the set of two dimensional DCTs based on a total sum of frequencies wherein the normalized max value is a score; and a stability component that aggregates scores for two dimensional DCTs of consecutive windows based on an aggregation window threshold, wherein if the aggregate scores meet a genre threshold, the audio sample is associated with a genre of music.

2. The system of claim 1, further comprising a chromagram component that generates a chromagram of the audio sample based on the spectrogram, wherein the discrete cosine transform component generates the set of two dimensional DCTs further based on the chromagram.

3. The system of claim 2, wherein the chromagram component generates the chromagram based on a number of bins and a single octave.

4. The system of claim 1, further comprising:
an efficiency component that stores two dimensional DCTs of the set of two dimensional DCTs based on a window sequence, wherein the discrete cosine transform component generates the set of two dimensional DCTs further based on the stored two dimensional DCTs and the window sequence.

5. The system of claim 1, wherein the spectrogram component generates the spectrogram using overlapping fast Fourier transforms.

6. The system of claim 1, wherein the window size is 5 seconds.

7. The system of claim 1, wherein the normalization component normalizes the max value using at least one of an L1 norm or a L2 norm.

8. The system of claim 1, wherein stability component identifies the audio sample as associated with a genre of music further based on at least seventy five percent of the aggregated scores meeting the genre threshold.

9. The system of claim 1, wherein the stability component aggregates scores based on at least one of simple average, mean, or standard deviations.

10. A method comprising:
using a processor to execute computer executable components stored on a computer readable medium to perform the following acts:
receiving an audio sample;
generating a spectrogram of the audio sample;
generating a set of two dimensional discrete cosine transforms (DCTs) based on a window and the spectrogram;
determining a max value for two dimensional DCTs in the set of two dimensional DCTs where the max value is not from the first column of respective two dimensional DCTs;

normalizing the max value for two dimensional DCTs in the set of two dimensional DCTs based on a total sum of frequencies wherein the normalized max value is a score;

aggregating scores for two dimensional DCTs of consecutive windows based on an aggregation window threshold; and identifying the audio sample as associated with a genre based on the aggregate scores and a genre threshold.

11. The method of claim 10, further comprising generating a chromagram of the audio sample based on the spectrogram, wherein the generating the set of two dimensional DCTs further based on the chromagram.

12. The method of claim 11, wherein generating the chromagram is based on a number of bins and a single octave.

13. The method of claim 10, further comprising:
storing two dimensional DCTs of the set of two dimensional DCTs based on a window sequence, wherein the generating the set of two dimensional DCTs is further based on the stored 2-dimensional DCTs and the window sequence.

14. The method of claim 10, wherein generating the spectrogram is based on overlapping fast Fourier transforms.

15. The method of claim 10, wherein the window size is 5 seconds.

16. The method of claim 10, wherein normalizing the max value is based on at least one of an L1 norm or a L2 norm.

17. The method of claim 10, wherein the identifying the audio sample as associated with a genre is further based on at least seventy five percent of the aggregated scores meeting the genre threshold.

18. The method of claim 10, wherein the aggregating scores is further based on at least one of simple average, mean, or standard deviations.

19. A non-transitory computer-readable storage medium comprising computer-executable instructions that, in response to execution, cause a computing system to perform operations, comprising:
receiving an audio sample;
generating a spectrogram of the audio sample;
generating a set of two dimensional discrete cosine transforms (DCTs) based on a window and the spectrogram;
determining a max value for two dimensional DCTs in the set of two dimensional DCTs where the max value is not from the first column of respective two dimensional DCTs;
normalizing the max value for two dimensional DCTs in the set of two dimensional DCTs based on a total sum of frequencies wherein the normalized max value is a score;
aggregating scores for two dimensional DCTs of consecutive windows based on an aggregation window threshold; and
identifying the audio sample as associated with a genre based on the aggregate scores and a genre threshold.

20. The non-transitory compute-readable storage medium of claim 10, further comprising generating a chromagram of the audio sample based on the spectrogram, wherein the generating the set of two dimensional DCTs further based on the chromagram.

* * * * *